Dec. 6, 1927.
C. L. DICKERSON
STORAGE BATTERY
Filed Aug. 7, 1926
1,652,097
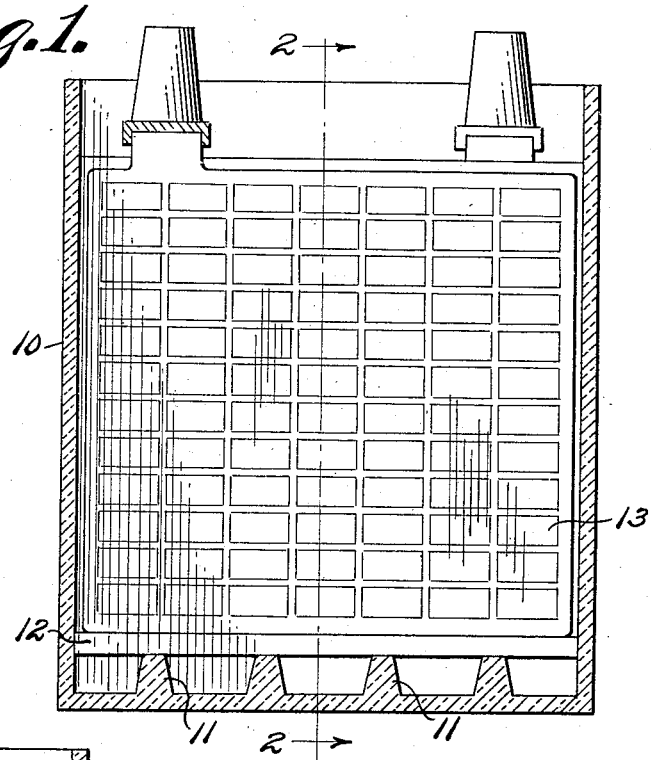
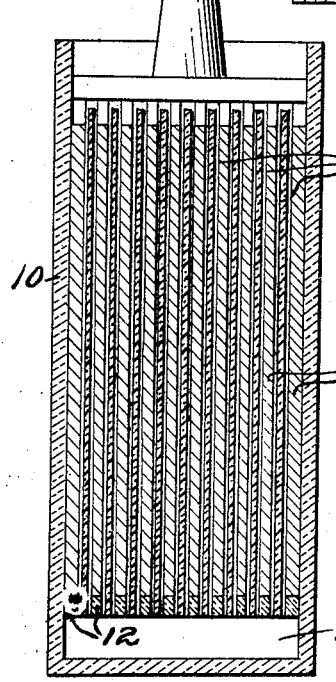
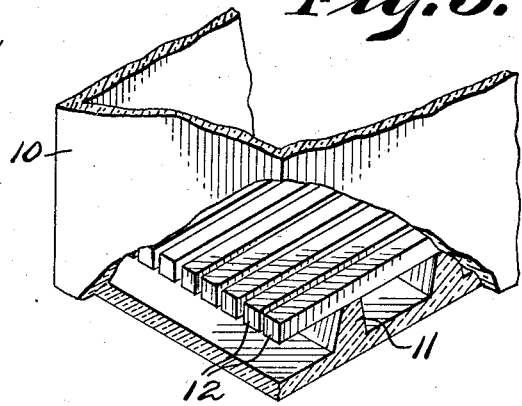
Charles L. Dickerson
INVENTOR
BY Victor J. Evans
ATTORNEY
WITNESS:

Patented Dec. 6, 1927.

1,652,097

UNITED STATES PATENT OFFICE.

CHARLES L. DICKERSON, OF CLINTON, ILLINOIS.

STORAGE BATTERY.

Application filed August 7, 1926. Serial No. 127,905.

This invention relates to storage batteries and has for its object the provision of a novel storage battery construction in which ample means is provided for taking care of the "mud" or other sediment which accumulates within a storage battery during the period of the operation thereof, the great advantage being that there will be less likelihood of short circuiting of the various plates or groups of plates.

Another object of the invention is to provide a storage battery in which the various groups of plates are separated by means of separate cores which, together with the plate of the battery itself rest upon supporting elements formed, preferably integrally, upon the bottom of the battery case so as to provide ample space for the accumulation of the sediment which is bound to accumulate in the course of time.

An additional object is to provide a device of this character which will be simple and inexpensive to manufacture, easy to construct and assemble, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a sectional view through a storage battery constructed in accordance with this invention.

Figure 2 is a vertical section taken on the line 2—2 of Figure 1, and

Figure 3 is a detail perspective view, parts being broken away and in section, this view illustrating the utilization of the spacing elements mounted upon the bottom of the battery case.

Referring more particularly to the drawings, I have shown the battery as comprising a case or container 10 of hard rubber or other material such as is commonly used for this purpose, this container being open at the top and provided at its bottom with a plurality of spaced parallel upstanding ribs or ridge members 11 which are preferably wedge-shaped in cross section. Mounted upon these members 11 is a series of transversely arranged bars or strips 12, necessarily of insulating material and which constitute the supporting means for the plate of the battery. It is preferable that the bars or strips 12 be arranged in slightly spaced relation in order that any sediment may be deposited between them onto the bottom without any possibility of short circuiting the plates themselves.

The battery is further shown as comprising a plurality of plates 13 between which are located separators 14, these separators being of such size as to extend entirely from side to side of the container or case 10 so as to project beyond the edges of the plates 13.

It is of course true that the exact configuration of the plates themselves may be varied within wide limits and it is equally true that the construction of the separators may be varied, though it should be understood that a feature of the invention is the provision of the separators which extend from side to side of the container, casing or receptacle beyond the edges of the plates so that there will be no possibility or probability of short circuiting at this point. Furthermore, it will be noted that all of the plates as well as the separators are supported upon the transverse ridges or web members 11 and that they will therefore be spaced from the bottom of the receptacle or container so that any sediment which may accumulate from time to time, as is well known, may be accommodated within the spaces between the members 11.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a storage battery, a receptacle of insulating material provided at its bottom with a plurality of spaced upstanding transverse ribs, bars of insulating material arranged within the receptacle transversely upon said ribs, battery plates having their lower edges resting upon said bars, and separators between the successive plates extending down between said bars and engaging upon the top of said ribs.

In testimony whereof I affix my signature.

CHARLES L. DICKERSON.